(12) United States Patent
Mair et al.

(10) Patent No.: US 6,349,164 B1
(45) Date of Patent: Feb. 19, 2002

(54) SHIELDING APPARATUS FOR A LIGHT WAVEGUIDE PLUG ARRANGEMENT

(75) Inventors: Eduard Mair; Peter Sedlmeier, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/423,867

(22) PCT Filed: Apr. 8, 1998

(86) PCT No.: PCT/DE98/00994

§ 371 Date: Nov. 15, 1999

§ 102(e) Date: Nov. 15, 1999

(87) PCT Pub. No.: WO98/52080

PCT Pub. Date: Nov. 19, 1998

(30) Foreign Application Priority Data

May 17, 1997 (DE) .......................................... 197 20 445

(51) Int. Cl.[7] .................................................. G02B 6/00
(52) U.S. Cl. .......................................... 385/134; 385/56
(58) Field of Search .............................. 385/134–139, 385/56, 60, 76–78; 439/608, 108; 174/35 R

(56) References Cited

U.S. PATENT DOCUMENTS 5,563,972 A * 10/1996 Krausse et al. ............... 385/56

FOREIGN PATENT DOCUMENTS

| EP | 0 580 289 A1 | 1/1994 |
| FR | 0 267 074 | 5/1988 |
| WO | WO 94/12900 | 6/1994 |

OTHER PUBLICATIONS

Patent Abstracts of Japan—58186709—Oct. 31, 1983.

* cited by examiner

Primary Examiner—Phan T. H. Palmer
(74) Attorney, Agent, or Firm—Bell Boyd & Lloyd LLC

(57) ABSTRACT

A shielding apparatus is connected in contacting fashion to a shielding ply of a backplane printed circuit board of a module chassis, is provided with contact openings at which the shielding apparatus can be contacted with metallic guide sleeves onto which plug connectors for light waveguides coming from the outside can be plugged. Specifically, contact openings are provided with star-shaped slots between which resiliently deflectable, radially resilient contact tongues are formed which engage an outside surface of the guide sleeves.

6 Claims, 2 Drawing Sheets

SHIELDING APPARATUS FOR A LIGHT WAVEGUIDE PLUG ARRANGEMENT

BACKGROUND OF THE INVENTION

1. Field of the Invention

The present invention is directed to a shielding apparatus for an arrangement of a pluggable connection of at least one light waveguide to a module chassis.

2. Description of the Prior Art

Related shielding designs have been disclosed, for example, by WO 94/12900. In accord therewith, a housing in which metallic guide sleeves, that project through a clearance of a backplane printed circuit board, are accepted is attached to the inside of the backplane printed circuit board of a module chassis. A plug connector from a light waveguide coming from the outside can be plugged onto the guide sleeves. The plug connector includes a metallic union nut that can be screwed to the guide sleeve. The backplane printed circuit board includes a shielding ply at its outside onto which a metallic member is applied; a metallic shielding sleeve being screwed thereto. The union nut and the shielding sleeve are extended beyond the plug.

In this region, the shielding sleeve includes spring tongues that have been cut free and that lie against a smooth-surfaced contact section of the union nut. The diameter of the clearance is of such a size that the guide sleeve or, respectively, the plug connector do not laterally touch the backplane printed circuit board in order to avoid a distortion of the plug connector arrangement. The clearance is electromagnetically closed and adequately shielded by the chimney-like shielding arrangement.

The present invention is therefore directed to an alternative shielding arrangement for the above-described configuration wherein the manufacturing and assembly outlay for such shielding arrangement may be greatly reduced.

SUMMARY OF THE INVENTION

Pursuant to the present invention, a guide sleeve can be of such a length that it not only projects into the clearance, but also through it. The shielding apparatus bridges the distance between the guide sleeve and the shielding ply over a short path. It directly contacts both the shielding ply and the guide sleeve so that intermediate contacts are eliminated. The shielding apparatus can be formed simply and cost-beneficially and requires little space; thus, simple assembly is enabled. The plug connection is substantially easier to access compared to an arrangement having a shielding sleeve that can be screwed in. As a result, the distance between neighboring plug connectors can be reduced.

The lateral resilience of the contact opening relative to the guide sleeve prevents lateral forces from being exerted thereon. Such forces, for example, can bend the slotted guide sleeve and deteriorate the optical connection quality.

The clearance can, for example, be formed as a through-plated bore connected to the shielding ply. The sleeve-shaped shielding apparatus can, for example, be composed of highly conductive elastomeric plastic and can include an inner, all around rib. The shielding apparatus is introduced into the bore and contacts the guide sleeve with the resilient rib. The lateral resilience of the shielding apparatus also yields a dependable contacting along the circumference of the shielding sleeve.

In an embodiment, the shielding apparatus can be punched in a simple way from a contact sheet of, for example, brass, bronze, Gennan silver or chrome-nickel steel. The circumference of the guide sleeve can include sharp-edged ribs pointing in longitudinal direction; for example, in the form of a knurl that presses itself into the smoothly circular contact opening. This yields a number of reliable contact locations that electromagnetically close the remaining gaps. The shielding apparatus can be connected to the shielding ply by soldering, for example. The shielding apparatus can be kept so thin that it does not impede the installation of other component parts.

In another embodiment, when the guide sleeve is plugged through, the contact tongues of the shielding apparatus are obliquely deflected out of the material plane so as to conform with resilient stress against, for example, the cylindrical outside cladding of the guide sleeve. This yields a dependable contacting given great lateral resilience, which enables a corresponding compensation of tolerances between the shielding apparatus and the guide sleeve.

In a further embodiment, a single shielding apparatus is particularly formed so as to contact a number of guide sleeves.

In another embodiment, the shielding apparatus is contacted with the shielding ply in a simple, clamping manner. A particular advantage of such embodiment is that the shielding apparatus can be delivered pre-mounted at the housing, so that any and all added outlay in the assembly of the module chassis is eliminated.

In yet a further embodiment, the shielding apparatus is centered at the housing. The centering openings can be kept such that the shielding apparatus clamps to them and is, thus, reliably held for final assembly.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
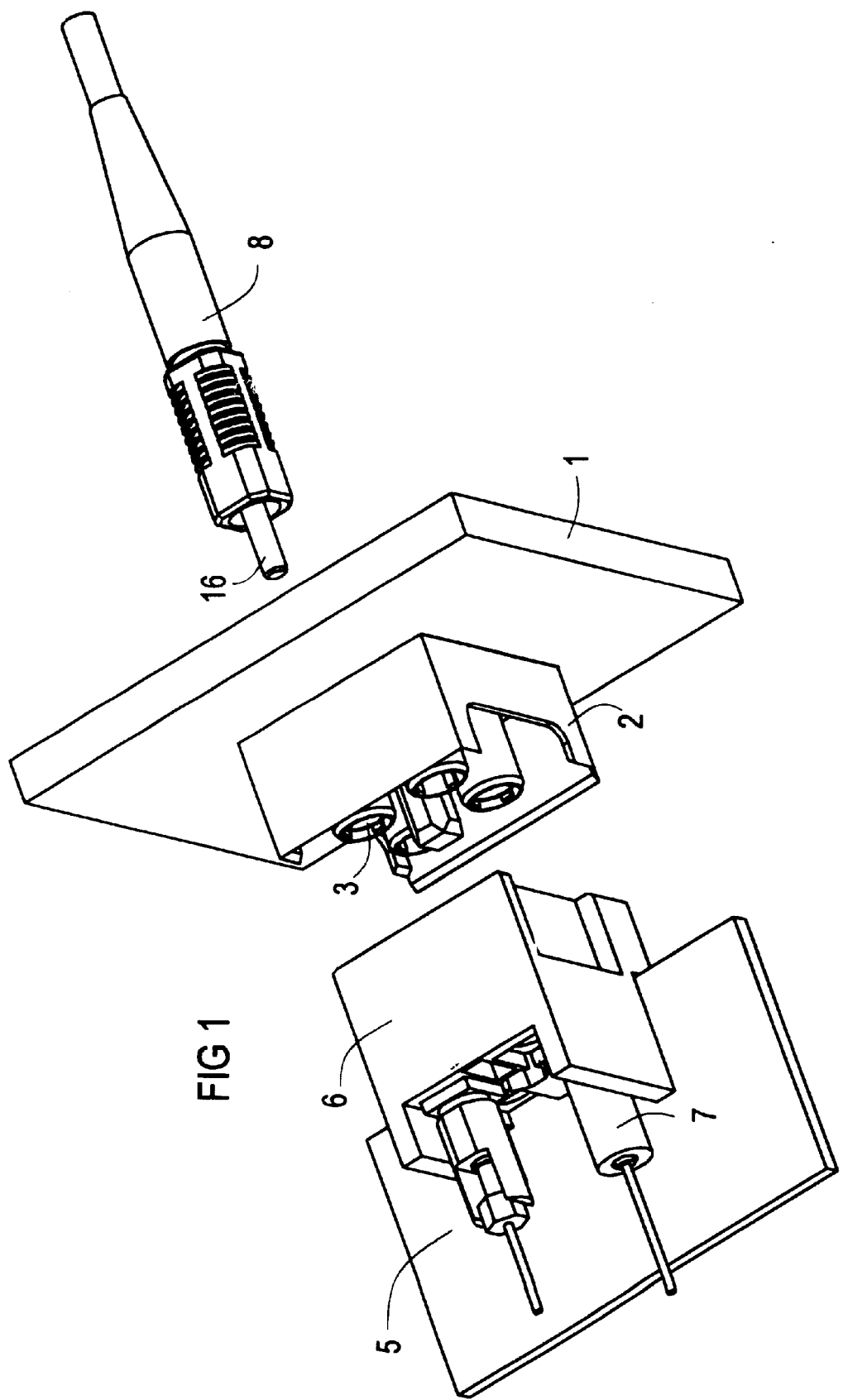
FIG. 1 shows a perspective view of a portion of a module chassis with a plug connector for a light waveguide.
Figure 2:
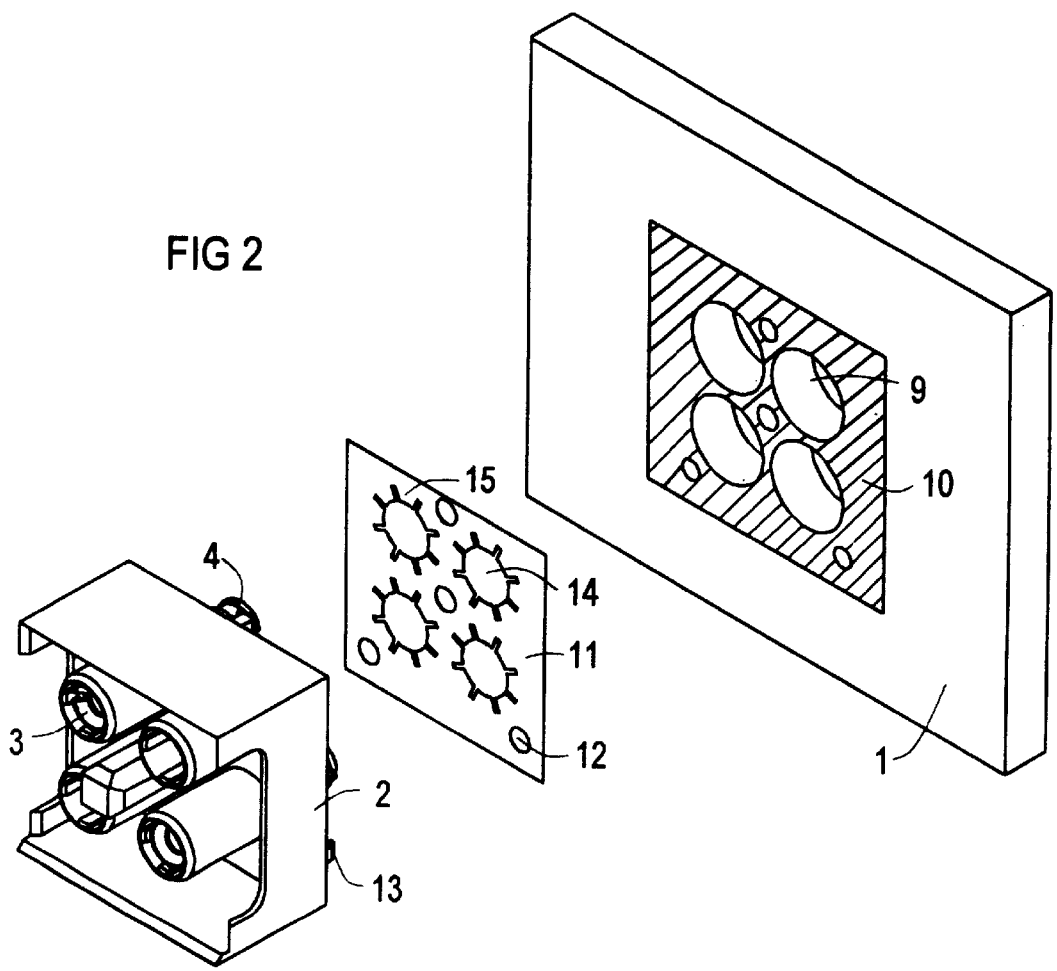
FIG. 2 shows parts of the assembly chassis according to FIG. 1, as well as the shielding apparatus of the present invention, immediately before assembly.

According to FIG. 1, a module chassis (shown in simplified detail) for insertable assemblies includes a backplane printed circuit board 1 to whose assembly side a housing 2 is secured. The housing 2 is provided with receptacles 3 for guide sleeves 4 (FIG. 2). An insertable assembly 5 includes a comer edge connector 6 having plug pins 7 connected to light waveguides that can be plugged into the guide sleeves 4 of the housing 2 with plug pins that are not visible here. Plug connectors 8 for light waveguides can have their plug pins 16 individually plugged into the guide sleeves 4 at that side of the backplane printed circuit board 1 lying opposite the housing 2.

Figure 3:
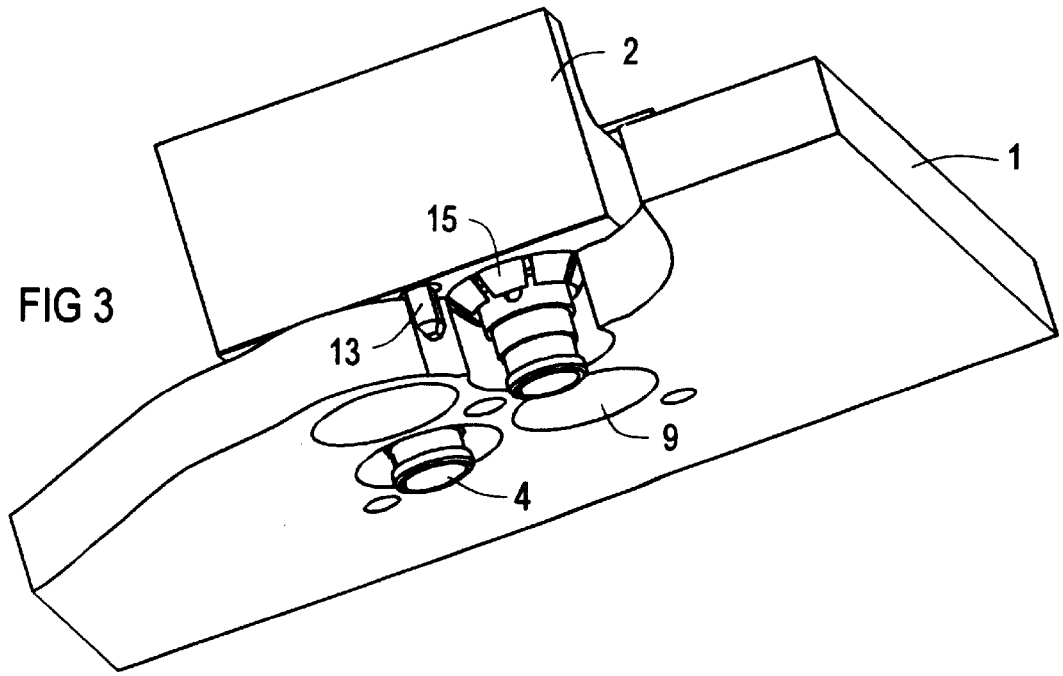
FIG. 3 shows the parts of FIG. 2 in a different perspective view after assembly.

According to FIGS. 2 and 3, the backplane printed circuit board 1 is provided with cylindrical clearances 9 into which the guide sleeves 4 project, with play, after assembly. At the side which meets the housing 2, the backplane printed circuit board 1 is provided with a shielding ply 10 that is uncovered at least in the region of the housing 2. A shielding apparatus which is formed as a shielding plate 11 is positioned between the housing 2 and the shielding ply 10 and is clamped therebetween in contacting fashion in the assembled condition. The shielding plate 11 includes centering openings 12 with which it is fixed on correspondingly arranged centering pegs 13 of the housing 2.

The shielding plate 11 also is provided with contact openings 14 into which radially proceeding, narrow slots are arranged in star-shaped fashion. As a result, a number of individual contact tongues 15 are formed whose free ends point inward toward a center of the contact opening 14. The clearance between opposingly-positioned contact tongues 15 (i.e., inside diameter of the contact opening 14) is narrower than the outside diameter of the guide sleeves 4 in the region of the shielding plate 11.

When joining the parts, the guide sleeves 4 pass through the contact openings 14 of the shielding plate 11, wherein the contact tongues 15 are deflected into the clearance and lie against the outside cladding of the guide sleeves 4 under spring tension. The resilient yielding of the contact tongues 15 enables the compensation of positional deviations between the shielding plate 11 and the guide sleeves 4 and also yields a number of dependable contacts between the shielding plate 11 and the guide sleeves 4.

Although the present invention has been described with reference to specific embodiments, those of skill in the art will recognize that changes may be made thereto without department from the spirit and scope of the invention as set forth in the hereafter appended claims.

We claim:

1. A shielding apparatus for a pluggable connection arrangement of at least one light waveguide to a module chassis, wherein the arrangement includes a metallic guide sleeve for a plug connector of the light waveguide, the guide sleeve projecting into a clearance of a backplane printed circuit board of the module chassis, the backplane printed circuit board including a shielding ply to which the shielding apparatus may be contacted, the shielding apparatus comprising a shield member for shielding bridging of the interspace between the guide sleeve and the backplane printed circuit board, wherein the shield member includes a contact opening having a contactable circumferential edge for contacting an outside cladding of the guide sleeve in transversely resilient fashion.

2. A shielding apparatus for a pluggable connection arrangement of at least one light waveguide to a module chassis as claimed in claim 1, wherein the shield member is formed as a thin shielding plate for covering the interspace such that the shielding plate can be contacted flat with the shielding ply of the backplane printed circuit board, and wherein the contact opening is narrower than a diameter of the contacted outside cladding of the guide sleeve.

3. A shielding apparatus for a pluggable connection arrangement of at least one light waveguide to a module chassis as claimed in claim 2, wherein the shielding plate can be clamped between a housing and the shielding ply of the backplane printed circuit board, the housing having receptacles for the guide sleeves and being securable to a side of the backplane printed circuit board which includes the shielding ply.

4. A shielding apparatus for a pluggable connection arrangement of at least one light waveguide to a module chassis as claimed in claim 3, wherein the shielding plate includes centering openings through which centering pegs of the housing may project.

5. A shielding apparatus for a pluggable connection arrangement of at least one light waveguide to a module chassis as claimed in claim 2, wherein the shielding plate includes slots arranged in star-shaped fashion proceeding radially outward from the contact opening between which contact tongues are formed which are deflectable out of a plane of the shielding plate such that inwardly directed, free ends of the contact tongues substantially form the contact opening.

6. A shielding apparatus for a pluggable connection arrangement of at least one light waveguide to a module chassis as claimed in claim 2, wherein the shielding plate includes a plurality of contact openings for a plurality of guide sleeves neighboring one another.

\* \* \* \* \*